Nov. 15, 1955   E. WEISS   2,723,643
BEVERAGE CUP INCORPORATING INDICATING MEANS
FOR DESIGNATING CHARACTER OF CONTENTS
Filed Nov. 4, 1952

INVENTOR.
EDWIN WEISS
BY
ATTORNEY

United States Patent Office 2,723,643
Patented Nov. 15, 1955

2,723,643

BEVERAGE CUP INCORPORATING INDICATING MEANS FOR DESIGNATING CHARACTER OF CONTENTS

Edwin Weiss, Lorain, Ohio, assignor of one-third to Israel F. Roberson, Lakewood, Ohio, and one-third to Brennan B. West, Cleveland Heights, Ohio Application November 4, 1952, Serial No. 318,643

5 Claims. (Cl. 116—133)

It is a prevailing custom for office and shop workers and the personnel of other establishments to send out for coffee or other beverages during the course of a day, to be delivered in individual containers or cups. Ordinarily, several orders are involved, and these orders usually differ as to contents. Taking coffee as an example, some individuals will prefer the coffee straight or, in other words, black. Others will want it with cream or sugar, and still others with both cream and sugar.

Employees of restaurants, lunch counters and refreshment stands that cater to this class of trade are usually rushed and find it difficult to mark the individual containers as to the nature of the contents. Sometimes the person who is sent on the errand will endeavor to do so, but this is made difficult by the fact that the containers are immediately closed, and it is not until the orders are delivered, and the containers opened, that an individual may select what he ordered, usually by tasting it because the presence or absence of sugar cannot be detected otherwise.

It is the purpose of my invention to solve this difficulty in an exceedingly simple and inexpensive manner by printing or otherwise imposing upon the beverage cups and the lids thereof, cooperating index and indicia that, by being properly related, will show at a glance the character of the contents, or the combination of ingredients that make up the same. By simply applying the lid in a selected orientated position with respect to the cup, the nature of the contents is shown.

As generally known, beverage cups of the kind commonly used for the purpose stated are provided with friction lids by which the cups may be tightly closed, the lid consisting of a disc of cardboard having a marginal lug that is turned up when the lid is forced into the top of the cup against an internal circumferential shoulder, the lug serving to facilitate removal of the lid.

I presently prefer to employ this type of cup; and printed or otherwise imposed upon the peripheral wall of the cup, at spaced intervals thereabout, are indicia respectively designating different characteristics the contents of the cup may possess, or the different combinations of ingredients that may make up the contents. Similarly applied to the lid is an index or pointer that may be disposed in approximate registration with any selected one of the indicia, when the lid is applied to the cup. Obviously, the foregoing arrangement may be reversed and the indicia applied to the lid and the index to the body of the cup. It is evident, with respect to the first described arrangement, that the lug of a lid of the kind above described may serve the purpose of the index. However, I presently prefer to use a special marking for the index because the purpose of such marking would immediately be apparent to a novice.

In the accompanying drawing, which forms a part hereof,

Figure 1:
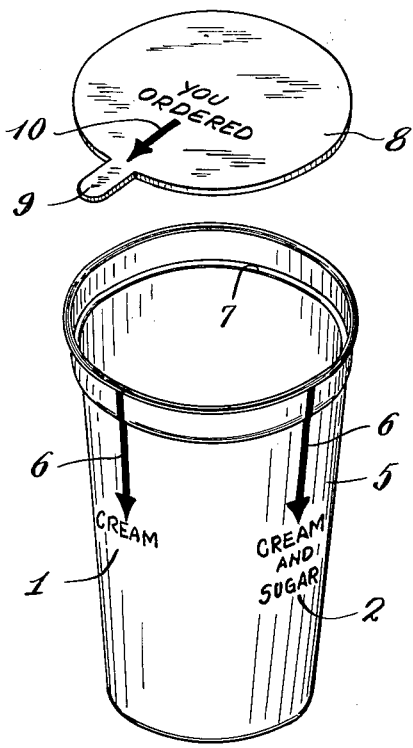
Fig. 1 is a perspective view of a beverage cup and its lid, with the latter removed, incorporating one form of my invention.
Figure 2:
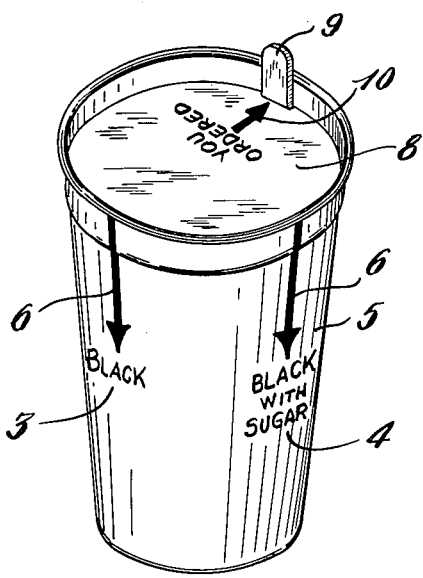
Fig. 2 is a similar view of the cup as it would appear from the side opposite that shown in Fig. 1 and with the lid applied to the cup.

Describing, first, the form of the invention illustrated in Figs. 1 and 2; indicia (four in the present instance): designated 1, 2, 3 and 4, are fixedly applied to the peripheral wall of the cup or cup member 5, as by printing, and they are shown as spaced substantially equal distances apart about the cup. Desirably associated with each indicia is a marker 6, illustrated as an arrow, that has its upper end adjacent the top of the cup.

The cup, as shown, is primarily intended for coffee, although it would be equally suited to tea, or to hot chocolate or cocoa. Accordingly, the present indicia are illustrated as consisting, respectively, of the words "Black," "Black with sugar," "Cream" and "Cream and sugar."

Although containers of the kind disclosed are ordinarily referred to as paper cups, they are constructed of lightweight, flexible cardboard suitably treated so as to be unaffected by hot coffee or other hot beverages, and at their upper ends are slightly enlarged to produce an internal shoulder 7. The lid or lid member 8 consists of a disc or cardboard of a size to snugly fit within the enlarged upper end of the cup and bear against the shoulder 7. A lug 9 projects from the edge of the cover and initially is in the plane thereof. When the lid is applied to the cup, the lug is turned abruptly upwardly, as shown in Fig. 2, in which position it may readily be grasped for the purpose of removing the lid. An index or pointer 10 is applied to the exterior surface of the lid, and it is shown in line with the lug 9. As previously stated, the index may be omitted and the lug 9 made to serve the purpose thereof. Such secondary purpose of the lug, however, would be less apparent than the purpose of a special mark. Obviously, the invention is not limited to this particular kind of cup further than is required by the terms of the appended claims.

In the use of the cup above described, it is filled to substantially the level of or slightly below the shoulder 7 with black coffee, or with coffee containing cream or sugar, or cream and sugar, and the person filling the order then takes a lid, turns up the lug 9, and applies the lid to the cup with the index or pointer 10 approximately in register with or in functional relation to the marker 6 that is associated with the appropriate one of the indicia. This locating of the lid in a particular orientated position with respect to the cup is facilitated somewhat by aligning the index or pointer 10 with the lug 9.

From the foregoing it will be seen that the person filling the order uses the cup in precisely the same manner as heretofore, the only additional attention or care required being that of approximately registering the index 10 with the selected marker 6 that leads to that one of the indicia which designates the nature of the contents of the cup.

Figure 3:
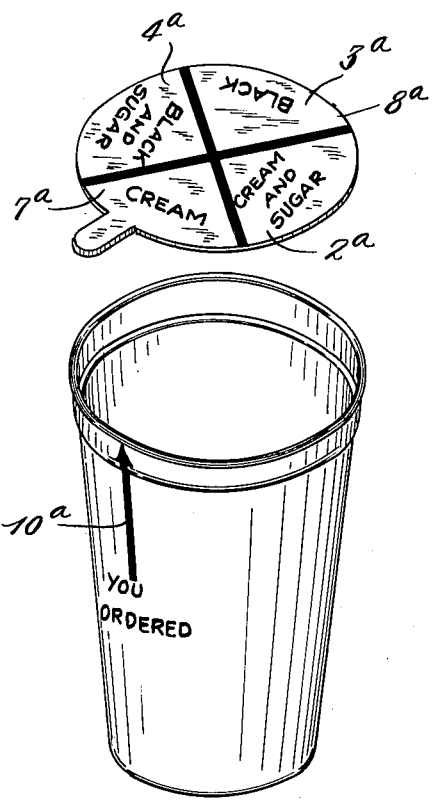
Fig. 3 is a perspective view of a beverage cup and its lid, incorporating another form of the invention.

In the form of the invention shown in Fig. 3, the indicia 1ᵃ, 2ᵃ, 3ᵃ and 4ᵃ are spaced apart circumferentially of the lid or lid member 8ᵃ, and the index or pointer 10ᵃ is applied to the peripheral wall of the cup or cup member, with one end thereof in close proximity to the top edge of the cup. In this case, the lid is applied to the cup with that one of the indicia 1ᵃ to 4ᵃ that designates the character of the contents of the cup adjacent the index 10ᵃ.

Having thus described my invention, what I claim is:

1. In combination, a beverage cup member of flexible material, a lid member for application to the cup member in different orientated positions with respect to the latter member, the lid member tightly fitting the top of the cup member so as to be firmly held thereto by friction against relative turning, an index fixedly carried by one of said members, and indicia carried by the other member in fixed relation thereto and spaced apart circumferentially of said other member, the index and a selected one of the indicia being adapted to be disposed in functional relation to each other when the lid member is being applied to the cup member, the respective indicia designating different characteristics of the contents of the cup member.

2. A beverage cup, and a lid for tight frictional engagement therewith in different orientated positions with respect to the cup and so as to be firmly held against relative turning, an index fixedly carried by the lid, and indicia fixedly carried by and spaced apart circumferentially of the cup, the index being adapted to be placed in functional relation to a selected one of the indicia when the lid is being applied to the cup, the respective indicia designating different characteristics of the contents of the cup.

3. A beverage cup comprising the combination and arrangement of parts defined by claim 2, wherein the index has a part closely adjacent the edge of the lid, and the indicia are spaced a substantial distance from the top of the cup, and a marker fixedly applied to the cup above each indicia and having a part closely adjacent the top edge of the cup.

4. A beverage cup of lightweight flexible cardboard, a cardboard lid for tight frictional engagement downwardly within the top thereof in different orientated positions with respect to the cup, the lid including a peripheral lug, and indicia fixedly carried by the peripheral wall of the cup and spaced apart circumferentially thereof, the lug serving as an index and being adapted to be placed in approximate registration with a selected one of the indicia when the lid is being applied to the cup, the respective indicia designating different characteristics of the contents of the cup.

5. A beverage cup, a lid for tight frictional engagement therewith in different orientated positions with respect to the cup and so as to be firmly held against relative turning, an index fixedly carried by the cup, and indicia fixedly carried by and spaced apart circumferentially of the lid, a selected one of the indicia being adapted to be placed in functional relation to the index when the lid is being applied to the cup, the respective indicia designating different characteristics of the contents of the cup.

References Cited in the file of this patent
UNITED STATES PATENTS

| | | |
|---|---|---|
| 169,992 | Hawkins | Nov. 16, 1875 |
| 1,850,494 | Brewer | Mar. 22, 1932 |
| 2,587,147 | Guion | Feb. 26, 1952 |